United States Patent
Dahl

[11] 3,803,793
[45] Apr. 16, 1974

[54] METHOD AND APPARATUS FOR PRELOADING A JOINT

[75] Inventor: Warren F. Dahl, Philadelphia, Pa.

[73] Assignee: Standard Pressed Co., Jenkintown, Pa.

[22] Filed: Sept. 1, 1972

[21] Appl. No.: 285,906

Related U.S. Application Data

[63] Continuation of Ser. No. 28,377, April 14, 1970, abandoned.

[52] U.S. Cl............52/758 F, 85/1 R, 151/2, 29/517
[51] Int. Cl. .......................... F16b 5/02, F16b 35/00
[58] Field of Search ......... 287/189.36 F, 189.36 D; 85/1 R, 1 T, 32 T, 50 AT, 50 R, 7; 151/2, 21 C, 14 R, 14 DW; 29/452, 517, 526; 254/29; 285/382

[56] References Cited
UNITED STATES PATENTS

| | | | |
|---|---|---|---|
| 2,923,339 | 2/1960 | Skidmore | 151/21 B |
| 3,202,036 | 8/1965 | Simko | 85/77 |
| 3,421,562 | 1/1969 | Orloff et al. | 151/2 |
| 3,440,922 | 4/1969 | Cohen | 85/9 R |
| 3,464,472 | 9/1969 | Reynolds | 151/2 |
| 3,655,227 | 4/1972 | Orloff | 287/189.36 F |

*Primary Examiner*—Ramon S. Britts

[57] ABSTRACT

A fastener assembly including a bolt member for preloading a joint wherein a deformable washer is interposed between an extending portion of a threaded fastener element and the adjacent work piece. The threaded fastener and washer are first snugged against the work piece and the deformable washer is then crimped to elongate the washer thereby stretching the bolt by reaction of the washer against the bolt and the adjacent work piece. Elongation of the bolt effects a preload in the joint which may be predetermined to provide a uniform clamping force in a joint.

6 Claims, 7 Drawing Figures

PATENTED APR 16 1974 3,803,793
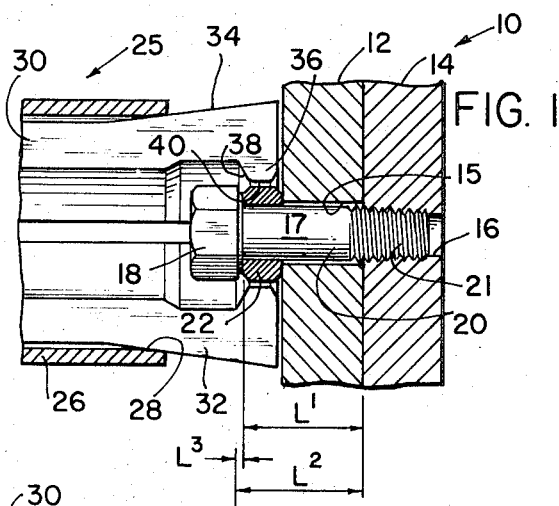
FIG. 1
FIG. 2
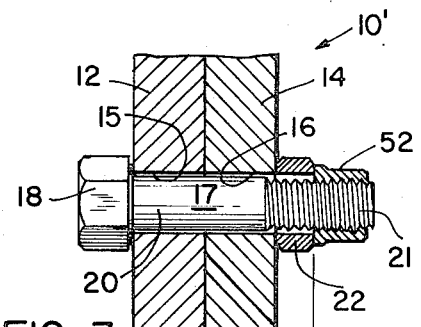
FIG. 3
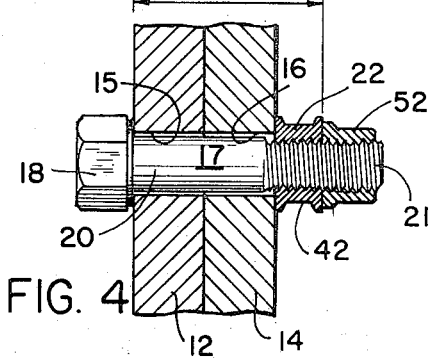
FIG. 4
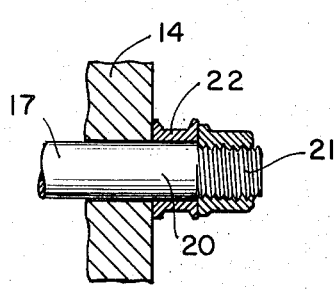
FIG. 5
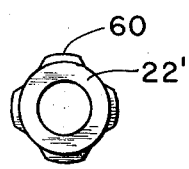
FIG. 6
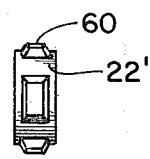
FIG. 7
*INVENTOR*
WARREN F. DAHL
BY
Curtis, Morris & Safford
ATTORNEYS

METHOD AND APPARATUS FOR PRELOADING A JOINT

This application is a continuation of application Ser. No. 28,377, filed Apr. 14, 1970, and now abandoned.

The present invention relates to fastener assemblies and more particularly, to fastener assemblies adapted to preload a joint assembly.

In certain applications it is desirable to preload a joint with a high residual tension or clamping force. When such a residual tension, also referred to hereinafter as preload or prestress, is applied to a joint the result is a joint which exhibits a high fatigue life and, also, a tight rigid joint. In addition, it has been found that prestressed joints are able to withstand higher tensile loads before failing than a similar joint which has not been prestressed.

One of the known methods of preloading a joint assembly is by applying a torque of a predetermined magnitude to a nut and bolt assembly. The degree of prestressing achieved by this method is related to the magnitude of the torque applied. However, the actual degree of prestressing cannot be predetermined accurately because the relationship between torque and preload is not always linear or predictable. This is due in part to the frictional effects between the bolt and nut, and also between the nut and/or bolt head and the surface of the work piece. In addition, inordinately high torque values are required to achieve a high degree of preload.

Other known methods to prestress a joint include use of a fastener such as a lockbolt of the type disclosed in U.S. Pat. No. 2,531,048 and high shear rivets of the type disclosed in U.S. Pat. No. 2,355,580. While use of the lockbolt system in many instances permits the development of consistent, predeterminable high preloads, it has the disadvantage that the pintail is broken off and discarded as scrap. Where large diameter bolts or costly alloys are used, a lockbolt system of fastening may prove to be needlessly expensive. The high shear rivet type of fastener requires the use of a hammer drive set and further, fasteners of this type can develop only relatively low preloading forces in a joint.

Another known method for achieving controlled and uniform prestressing in a joint assembly includes the use of a bolt and a counter-bored nut wherein the bolt is provided with peripheral grooves adjacent its free end. Some of these grooves form a screw thread and the remaining grooves provide an antirotation locking feature for the device. The nut is formed with an internal bore which is internally threaded over only a portion of its length and is adapted to threadably engage the bolt with the unthreaded counter-bore portion adjacent the work piece. After the nut is torqued snug on the bolt, with a relatively low torque, the portion having the unthreaded counter-bore is crimped against the locking grooves. The crimping effects an elongation of this portion of the nut and since the nut is fixed relative to the bolt by the engagement of the threaded portion of the nut bore and threaded bolt, the elongation of the nut causes the bolt to elongate. This elongation in the bolt places it under high tension which, together with the tension provided by the initial torquing, results in a joint assembly having a high preload.

While this type of assembly can achieve high prestressed joint assemblies with consistent predetermined prestresses, it is not suitable for use in bolt-tapped hole applications or where a bolt is engaged in a threaded bore in a work piece where no nuts are used, or in applications where the nut is inaccessible to a crimping device. In addition, the entire nut must be made of a relatively soft, more ductile material so that the crimping tool can deform the nut, and use of a nut of a soft, ductile material results in a joint whose strength is limited by the strength of the nut material.

It is therefore an object of this invention to provide an improved device for preloading joint assemblies which obviates the disadvantages of prior art devices. It is a further object of the present invention to provide a fastener assembly which may be used to accurately preload an assembled joint consistently to a predetermined preload. It is another object of the present invention to provide a relatively simple and inexpensive means to preload a joint using either bolt-tapped fasteners, blind threaded fasteners or bolt and nut threaded fastener assemblies.

In accordance with a preferred embodiment of the present invention there is provided a threaded fastener element, such as a threaded bolt, which may be used in conjunction with a nut or threaded in a tapped hole in a work piece and a deformable collar or washer member. The bolt having a head and a threaded free end is inserted through aligned bores of two or more work pieces which are to be joined so that the collar is between the bolt head and one of the work pieces. The bolt is adapted to extend through the aligned bores and either tap a thread form in one or more of the work pieces, threadably engage a threaded bore in one of the work pieces, or extend through the work pieces to be threadably engaged by a nut. When the bolt is torqued into threaded engagement, the collar is snugged between the bolt head and the outer surface of the adjacent work piece. After the bolt is seated, with a relatively low torque, the collar is crimped radially inwardly towards the bolt shank. The crimping effects an elongation of the collar which reacts between the bolt head and the outer surface of the adjacent work piece thereby to cause an elongation in the bolt shank as well and place the bolt and joint under a high residual tension or prestress, which together with the tension provided by the torquing action, results in a high and accurately predeterminable preload in the joint assembly.

In the drawings:

FIG. 1 is a side view, partly in section, of the fastener assembly of the present invention showing a selftapping bolt and collar in place and a crimping tool in position prior to crimping;

FIG. 2 is a view similar to FIG. 1 with the crimping tool shown at the completion of the crimping operation;

FIG. 3 is a view similar to FIG. 1 of an alternate embodiment of a fastener assembly using the deformable collar of the present invention;

FIG. 4 is a view of the structure shown in FIG. 3 at the completion of the crimping operation;

FIG. 5 is a partial view similar to FIG. 4, in which a slightly modified bolt is shown;

FIG. 6 is a front view of a modified deformable collar for use in the present invention; and FIG. 7 is a side view of the washer illustrated in FIG. 6.

Referring now to the drawings and in particular to FIG. 1, there is shown a joint assembly 10 prior to the application of preload forces by the fastener assembly of the present invention. Joint 10 includes work pieces, such as plate members 12 and 14, in face to face abutting relationship. The work pieces include substantially aligned unthreaded bores 15 and 16, respectively, therein with the diameter of bore 16 in work piece 14 being of somewhat smaller diameter than the bore 15 in work piece 12 so that an internal thread may be tapped therein. It is to be understood that bore 16 may be provided with an internal thread which may threadably engage the threaded bolt. In the embodiment illustrated, work pieces 12 and 14 are joined by a self-tapping bolt 17 to form an integral joint assembly.

Bolt 17 includes a head 18 provided with a suitable wrenching surface and a shank portion 20 having a thread-forming free end portion 21. The diameter of shank 20 is slightly smaller than the diameter of through bore 15 but thread-forming portion 21 has a diameter slightly larger than the diameter of bore 16. Therefore, as bolt 17 is torqued in work pieces 12 and 14, a complimentary thread form in bore 16 of outer work piece 14 is formed by thread-forming portion 21 of bolt 17.

A generally annular collar 22, formed of a readily deformable material, is placed about shank 20 prior to insertion of bolt 17 in work pieces 12 and 14, so that, as bolt 17 is snugged in place, collar 22 will be angaged on its opposed sides by head 18 and the surface of work piece 12. As head 18 is engaged with a wrenching tool to tighten bolt 17 and tap threads in bore 16, work pieces 12 and 14 are drawn together resulting in the application of a slight degree of tension or preload on the bolt and joint. Only a relatively low torque is required in the application of the present invention to snug the joint together since the final desired preload is achieved by deforming or crimping collar 22 between the head 18 of bolt 17 and work piece 12.

The crimping tool 25, seen in FIGS. 1 and 2, is a tool of the type shown in U.S. Pat. No. 3,421,562 and forms no part of this invention. In FIG. 1, the tool 25 is shown in position prior to the deformation of collar 22. Tool 25 includes an annular member or barrel 26 having a tapered circular mouth 28. A tubular crimping collet 30 is positioned within barrel 26 and includes a plurality of resilient arcuate jaws 32 having tapered outer surfaces 34 which are complimentary to the tapered mouth 28 of barrel 26. Jaws 32 also include arcuate projections or lobes 36 which extend radially inwardly and have generally inclined sides 38 and flat arcuate surfaces 40. In the embodiment illustrated, the included angle between surfaces 38 is approximately 60°.

In order to crimp collar 22, barrel 26 is moved relative to collet 30, towards work piece 12. By the coaction between tapered surfaces 28 and 34, resilient jaws 32 are moved radially inwardly toward collar 22 and bolt 17 to crimp the deformable collar, as shown in FIG. 2. In this manner, permanent depressions 42 are formed on the annular exterior surface of collar 22. When collar 22 is crimped so as to form depressions 42, an elongation of washer 22 results and, since bolt 17 is fixed by its threaded end 21 in work piece 14, and collar 22 is constrained between the head 18 of bolt 17 and work piece 12, the elongation of collar 22 will react or push against both the head 18 and work piece 12 to stretch bolt shank 20 and plate bolt 17 and joint 10 under additional tension or preload.

As seen in FIGS. 1 and 2 which show the elongation diagramatically to an exaggerated extent, the crimping operation increases the initial length $L^1$ of the bolt shank 20 between bolt head 18 and the interface between work pieces 12 and 14 to a length $L^2$. Thus a net increase in the length, $L^3$, of both bolt shank 20 and collar 22 is achieved, which produces the desired preload. The magnitude of this preload may be readily determined from the properties of collar 22 and the crimping force applied.

After the crimping operation is completed, barrel 26 is retracted to open jaws 32 to remove the tool 25 from engagement with bolt head 18. In this manner a rapid joint preload system is provided for a blind hole type joint wherein self-tapping or conventional threaded bolts must be used. In applications where a nut is applied on the threaded end of bolt shank 20, it often results that the end having the nut engaged thereon may be inaccessible to a crimping tool, and thus the fastener assembly of the present invention may be utilized to provide a prestressed joint assembly. Thus, in this type of application, the collar would be placed as described above and the threaded shank of the bolt would extend through the work pieces to be engaged by a conventional nut. Application of the fastener assembly of the present invention in this manner results in another beneficial aspect. Since a conventional nut configuration is employed, and since the nut is not deformed in order to induce a preload in the joint, the nut may be a high strength material. Thus both the bolt and nut may be of high strength materials to insure high structural integrity of the joint.

In FIGS. 3 and 4 a somewhat different joint assembly application is illustrated in which the preload inducing collar of the present invention is employed. In this joint 10', the aligned bores 15 and 16 in work pieces 12 and 14 are both through-holes of substantially the same diameter and bolt shank 20 extends therethrough. Collar 22, which as described previously, has an unthreaded bore, is placed around the threaded end 21 of bolt shank 20 and is snugged against the outer surface of work piece 14 by a conventional nut 52. In this joint assembly, nut 52 may be formed of heat treated or hardened material while collar 22 is formed of a readily malleable and more ductile material. The use of a hardened material produces a high strength nut which greatly strengthens the structural integrity of the joint under high preload stresses. In addition, should the joint later be disassembled both the bolt 17 and nut 52 will remain functional for reuse and only collar 22 need be replaced for reassembly of the joint.

Joint assembly 10' would preferably be used where the threaded end 21 of bolt 17 is accessible to a crimping tool similar to the tool 25 shown in FIG. 1. The tool is engaged with collar 22 and crimps and deforms the washer in te same manner as discussed above with reference to joint 10. Accordingly, collar 22 is elongated when depressions 42 are formed therein and reacts against nut 52 and work piece 14 to elongate shank 20 of bolt 17 a distance $L^3$. The elongation of bolt shank 20 and collar 22 preload the joint in the same manner as discussed above with respect to the embodiment of FIGS. 1 and 2.

During the crimping operation with the joint construction of the embodiment shown in FIGS. 3 and 4 material from collar 22 will tend to flow radially inwardly into the bolt threads 21. Thus, a partial complimentary thread formation on the internal surface of the bore of collar 22 will ensue. To facilitate later removal of collar 22, its peripheral surface is preferably knurled or provided with another suitable surface configuration for ready removal, for example with a wrenching tool.

Another embodiment is partially illustrated in FIG. 5. In this embodiment, the unthreaded shank 20 of bolt 17 extends beyond the surface of work piece 14 so that collar 22 surrounds the unthreaded portion 20 rather than the threaded portion 21. In this manner, the formation of complimentary thread forms on collar 22 is avoided. In all other aspects the function of collar 22 in this embodiment is the same as that of the embodiments of FIGS. 3 and 4.

In FIGS. 6 and 7 there is shown a modified form of the annular deformable collar. The collar 22' is provided with a plurality of circumferentially spaced protuberances 60 formed as an integral part thereof. During the crimping operation, jaws 32 and their annular flat surfaces 40 of tool 25 engage the protuberances 60 and force them radially inwardly in order to elongate the collar 22'. Protuberances 60 provide additional material on the collar so that the deformed portions thereof will have a greater thickness than the deformed portion 42 of collar 22. Thus, collar 22' will have increased rigidity and strength after completion of the crimping operation.

While preferred embodiments of the invention have been shown and described, it is of course understood that various changes and modifications may be made without departing from the true spirit and scope of the invention.

What is claimed is:

1. In a preloaded joint assembly including a plurality of adjacent work pieces having aligned bores therein, a preloaded fastening assembly comprising, a fastening member having a head and a shank portion, said shank portion having an unthreaded portion adjacent said head and a threaded free end portion threadably engaged within one of said work pieces, each of said work pieces comprising a plate-like member having a transverse dimension considerably greater than that of the maximum transverse dimension of said fastening member, and a deformable collar having a smooth surface internal bore surrounding said unthreaded shank portion and positioned between said head and another one of said work pieces, said fastening assembly being torqued in said joint assembly whereby said collar is snugged between said head and said another work piece, said collar being deformed radially inwardly toward said shank defining collar portions of denser material than the remainder of the collar whereby said collar is elongated in the longitudinal direction of said shank and thereby reacts against said head and said another work piece effecting an elongation of said shank and preloading said joint assembly.

2. The assembly as defined in claim 1 wherein said collar comprises a generally annular member initially having a plurality of circumferentially spaced protuberances on its outer periphery whereby said protuberances are crimped radially inwardly to effect elongation of said collar.

3. The joint assembly as defined in claim 1 wherein said fastening assembly includes a self-tapping bolt which taps a complimentary thread form in said one of said work pieces.

4. A method for assembling a joint assembly comprising a plurality of work pieces to be joined having substantially aligned bores therethrough, a fastener assembly including a threaded bolt having a head portion and a shank portion with said shank portion having an unthreaded portion adjacent said head and a threaded free end portion, said shank portion being disposed within said substantially aligned bores with said threaded free end portion threadably engaged within at least one of said work pieces, the steps of, placing an annular collar around said shank adjacent said head, inserting said shank through said aligned bores such that said collar is interposed between said head portion of said bolt and an outer surface of one of said work pieces, threadably engaging said fastener assembly within said at least one work piece to snug fit the joint assembly together, radially inwardly deforming selected portions of said collar thereby to effect a longitudinal elongation of said collar which reacts between the head portion of said bolt and said threadably engaged portion thereby to effect an elongation in the shank of said bolt to induce a preload on said bolt and joint assembly.

5. In a joint assembly including a plurality of adjacent workpieces having aligned openings therein, a preloaded fastening means comprising, a fastening member having an enlarged head and a shank portion extending through said openings, said head engaging the outer surface of one of said workpieces, said shank portion including a free end projecting beyond the outer surface of another one of said workpieces with at least said free end of said shank portion provided with peripheral thread-like deformations on its exterior surface, a deformable collar having an initially smooth surfaced internal bore extending throughout its axial length and surrounding said free end about said thread-like deformations on said shank and having one end engaging the outer surface of said another workpiece, said collar being deformed radially inwardly toward said shank portion defining collar portions of denser material than the remainder of the collar and defining complementary thread-like deformations within the surface of said internal bore of said collar, said complementary thread-like deformations comprising the sole thread means within said collar and defining the only portion of said collar engaging said shank, said deformation effecting an elongation of said collar in the longitudinal direction of said shank portion thereby reacting against the outer surface of said another workpiece and a separate removably positioned means bearing against the other end of said collar grippingly engaging a portion of said thread-like deformations, thereby clamping said joint assembly together and effecting an elongation in said shank portion to preload said joint assembly.

6. A joint assembly in accordance with claim 5 wherein said removably positioned means comprises an internally threaded nut member.

* * * * *